(12) United States Patent
Kitazawa

(10) Patent No.: US 6,930,423 B2
(45) Date of Patent: Aug. 16, 2005

(54) ROTATION ANGLE DETECTOR

(75) Inventor: Kanji Kitazawa, Nagano-ken (JP)

(73) Assignee: Tamagawa Seiki Kabushiki Kaisha, Iida (JP)

(*) Notice: Subject to any disclaimer, the term of this patent is extended or adjusted under 35 U.S.C. 154(b) by 9 days.

(21) Appl. No.: 10/839,292

(22) Filed: May 6, 2004

(65) Prior Publication Data
US 2005/0122097 A1 Jun. 9, 2005

(30) Foreign Application Priority Data
Dec. 4, 2003 (JP) .............................. 2003-406056

(51) Int. Cl.[7] .......................... H02K 19/16; G01B 7/30
(52) U.S. Cl. ...................... 310/168; 310/112; 310/184; 310/185; 310/68 B; 324/207.25
(58) Field of Search ................. 310/68 B, 111–112, 310/114, 126, 198, 168–170, 184–185; 324/163–164, 324/166–167, 207.25; 33/1 PT; 318/605

(56) References Cited

U.S. PATENT DOCUMENTS

| | | | | |
|---|---|---|---|---|
| 1,799,156 A | * | 4/1931 | Dornig ....................... 310/111 |
| 2,120,109 A | * | 6/1938 | Merrill ................... 310/156.64 |
| 2,753,475 A | * | 7/1956 | Curl ........................... 310/114 |
| 2,769,106 A | * | 10/1956 | Dembowski ................ 310/168 |
| 3,171,049 A | * | 2/1965 | Jarret et al. .................. 310/168 |
| 3,535,572 A | * | 10/1970 | Rugeris ....................... 310/168 |
| 3,688,306 A | * | 8/1972 | Oishi et al. .................... 341/15 |
| 4,659,953 A | * | 4/1987 | Luneau ........................ 310/111 |
| 4,764,767 A | * | 8/1988 | Ichikawa et al. ...... 340/870.31 |
| 4,794,511 A | * | 12/1988 | Lundin ........................ 363/156 |
| 4,870,358 A | * | 9/1989 | Glaize et al. ........... 324/207.22 |
| 4,998,084 A | * | 3/1991 | Alff ............................. 335/306 |
| 5,032,750 A | * | 7/1991 | Hayashi ....................... 524/101 |
| 5,250,889 A | * | 10/1993 | Ezuka ......................... 318/661 |
| 5,300,884 A | * | 4/1994 | Maestre ................. 324/207.25 |
| 5,444,368 A | * | 8/1995 | Horber ................... 324/207.16 |
| 5,446,966 A | * | 9/1995 | Ishizaki ...................... 33/1 PT |
| 5,486,731 A | * | 1/1996 | Masaki et al. .............. 310/180 |
| 5,757,182 A | * | 5/1998 | Kitazawa ............... 324/207.17 |
| 5,763,976 A | * | 6/1998 | Huard .......................... 310/168 |
| 6,472,841 B1 | * | 10/2002 | Piedl et al. .................. 318/661 |
| 6,552,453 B2 | * | 4/2003 | Ohiwa et al. ............. 310/68 B |
| 6,737,861 B2 | * | 5/2004 | Lantto .................... 324/207.16 |
| 6,756,709 B2 | * | 6/2004 | Kobayashi et al. ........... 310/43 |
| 6,815,863 B1 | * | 11/2004 | Jack et al. ................... 310/254 |

FOREIGN PATENT DOCUMENTS

| | | | | |
|---|---|---|---|---|
| JP | 7-318368 | * | 12/1995 | .......... G01D 5/245 |
| JP | 8-189805 | * | 7/1996 | ............ G01B 7/30 |
| JP | 10-288537 | * | 10/1998 | .......... G01D 5/245 |
| JP | 2002 54949 | * | 2/2002 | .......... G01D 5/245 |
| JP | 2002 168652 | * | 6/2002 | .......... G01D 5/245 |

* cited by examiner

Primary Examiner—Burton Mullins
(74) Attorney, Agent, or Firm—Wenderoth, Lind & Ponack, L.L.P.

(57) ABSTRACT

According to the present invention, when using a pair of annular stators stacked together, they are deviated from each other so that the projected poles may not overlap each other, whereby continuous winding is possible for each winding. Thus, a reduction in cost is achieved. In the rotation angle detector of the present invention, the first and second annular stators are stacked together such that the projected poles do not overlap each other, with the windings wound around the projected poles being wound continuously.

20 Claims, 7 Drawing Sheets (2X TYPE)

(3X~nX TYPE)

ROTATION ANGLE DETECTOR

BACKGROUND OF THE INVENTION

1. Field of the Invention

The present invention relates to a rotation angle detector, and in particular, to a novel improvement in which, in a variable reluctance (VR) type resolver using a rotor constructed solely of a core, with first and second annular stators being stacked together to cancel a deterioration in accuracy due to eccentricity, the positions of slots of the first and second annular stators are deviated from each other, whereby it is possible to form windings continuously around projected poles of the first and second stators by using a single winding apparatus, and it is possible to produce the rotation angle detector inexpensively by using conventional production equipment.

2. Description of the Related Art

As shown, for example, in Japanese Patent 3182493, in a rotation angle detector constructed of a conventionally used VR type resolver of this type, the core configurations of the annular stators are the same in the axial direction, that is, in the thickness direction, with a winding being wound around each projected pole.

With this construction, when the X-number, that is, the axial double angle, is large, the error in angle detection is small, and there is no problem for practical use. However, when the axial double number is small, that is, in the case, for example, of an axial double angle of 1X, an angular error of several tens of degrees is generated by little eccentricity.

To solve the problem of the angular error described above, there has been adopted a measure in which, as shown in Japanese Patent 3138606, a pair of resolvers adopting a pair of first and second annular stators are used and in which the first and second stators are stacked together, with the slot positions, that is, the projected pole positions being matched (coinciding with other), the windings (for excitation and 2-phase output) wound around the first and second annular stators being connected in series, whereby unbalance in the output voltage and angular error due to eccentricity are eliminated.

Further, as a measure for canceling the influence of eccentricity, there has been proposed a construction as shown in JP 07-043265 B, in which a pair of annular stators are used.

The conventional rotation angle detectors, constructed as described above, have the following problems.

That is, in the case of the construction of Japanese Patent 3138606, it is possible to cancel the influence of eccentricity, and the angular error in the case of 1X is significantly improved. However, since two independent resolvers are stacked together, it is necessary for the windings wound around the resolvers to be connected in series, so that the winding cannot be effected by a single winding operation.

Further, since a case and a shaft are required, the number of parts is doubled, resulting in an increase in cost. Further, due to the connection of the two resolvers, it is difficult to achieve a reduction in the axial length, that is, the thickness.

In the case of the construction disclosed in JP 07-043265 B, a pair of resolvers are combined so as to be stacked together as in the above case, so that the number of coil windings and stator parts and the number of assembly processes are large, making it difficult to achieve a reduction in cost.

SUMMARY OF THE INVENTION

It is an object of the present invention to provide a high accuracy resolver at a significantly reduced cost by stacking together a pair of first and second annular stators with their slots being deviated from each other, the windings being wound continuously by way of the first and second projected poles of the first and second annular stators.

A rotation angle detector according to the present invention includes an annular stator composed of a first annular stator having a plurality of first projected poles projected inwardly at predetermined angular intervals and a second annular stator stacked together with the first annular stator and having a plurality of second projected poles projected inwardly at predetermined angular intervals so as not to overlap the first projected poles. Further, the rotation angle detector of the present invention includes a rotor having first and second rotors rotatably provided inside the annular stator, corresponding to the first and second annular stators, differing from each other in phase, and being constructed solely of cores. Furthermore, the rotation angle detector of the present invention includes an exciting winding and output windings wound by using the first and second projected poles.

The rotation angle detector of the present invention may have such a structure that the exciting winding and the output windings are wound continuously from the initial to the terminal ends thereof by way of the first and second projected poles.

Further, the rotation angle detector of the present invention may have such a structure that an annular stator core is provided as a layer between the first and second annular stators.

Further, the rotation angle detector of the present invention may have a structure such that the first projected poles and the second projected poles are arranged so as to be opposed to each other by 180 degrees.

Further, the rotation angle detector of the present invention may have such a structure that the first and second annular stators and the first and second rotors are constructed by one of laminated plates, sintered bodies, molded products, and machined magnetic bodies.

Further, the rotation angle detector of the present invention may have such a structure that the first and second rotors are of an out-of-round configuration or an eccentric circular configuration for 1 or nX and are of a rotor outer diametrical configuration such that the gap permeance of the rotors and the stators varies at $\sin n\theta$ or $\cos n\theta$.

Further, the rotation angle detector of the present invention may have such a structure that an annular rotor core is provided as a layer between the first and second rotors.

Further, the rotation angle detector of the present invention may have such a structure that the number of slots formed in each of the first and second annular stators is at least four.

Further, the rotation angle detector of the present invention may have such a structure that the exciting winding and the output windings are of one of 2-phase/1-phase, 1-phase/2-phase, and n-phase/m-phase.

Further, the rotation angle detector of the present invention may have such a structure that the stators and the rotors are one of an outer type and an inner type.

Further, the rotation angle detector of the present invention may have such a structure that the exciting winding and the output windings of the stators are alternately wound around the projected poles of the stators.

The rotation angle detector of the present invention, constructed as described above, provides the following effects.

That is, the pair of first and second annular stators are stacked together, with their slot positions being deviated from each other, and the exciting winding and the 2-phase output winding are wound by way of the first and second projected poles (or slots) of the first and second annular stators, so that it is possible to perform winding continuously from the initial end to the terminal end of the windings by using a single winding apparatus.

Further, regarding the formation of these windings, the production is possible at the same production cost as in the case of the conventional multi-polar VR resolver, so that it is possible to obtain inexpensive and high-accuracy resolvers of 1X, 2X, . . . .

Further, since a 1X resolver can be produced at low cost, it is possible to provide a resolver capable of 360 degrees absolute angle detection that is optimum for angular control in an automotive power steering, an electric vehicle, a hybrid drive motor, a generator, etc., and fuel control valve position detection, etc. m are integers of one or more.

DESCRIPTION OF THE PREFERRED EMBODIMENT

In the following, a preferred embodiment of the rotation angle detector of the present invention will be described with reference to the drawings.

Figure 1:
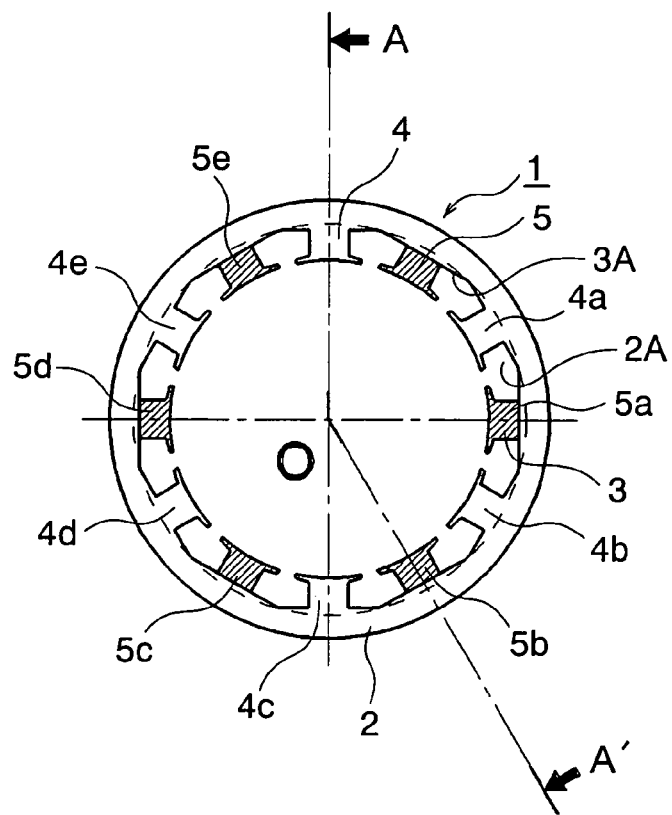
FIG. 1 is a plan view of the annular stator of a rotation angle detector according to the present invention.
Figure 2:
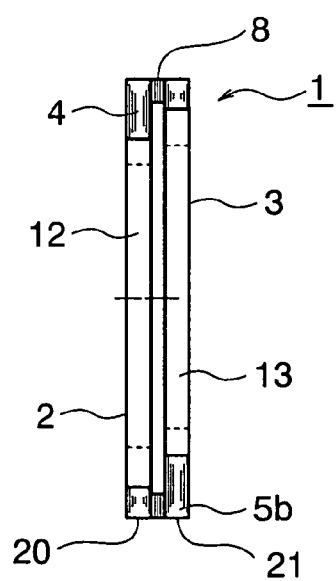
FIG. 2 is a sectional view taken along the line A-O-A' of FIG. 1.

In FIGS. 1 and 2, reference numeral 1 indicates an annular stator, which is formed by stacking together a pair of first and second annular stators 2 and 3.

The first annular stator 2 has a plurality of first projected poles 4 through 4e arranged at predetermined angular intervals and inwardly projecting, and the second annular stator 3 has a plurality of second projected poles 5 through 5e arranged at predetermined angular intervals and inwardly projecting. When the first and second annular stators 2 and 3 are stacked together, the first and second slots 2A and 3A are deviated from each other so that they may not overlap each other. As a result, the first projected poles 4 through 4e and the second projected poles 5 through 5e do not overlap each other in plan view, thus being formed in double the number in total. It is possible to provide an annular stator core 8 between the first and second annular stators 2 and 3 as needed; in some cases, however, no such stator core is used.

Further, as shown in FIG. 1, the projected poles 4 through 4e and 5 through 5e of the stators 2 and 3 are arranged so as to be opposed by 180 degrees.

Figure 3:
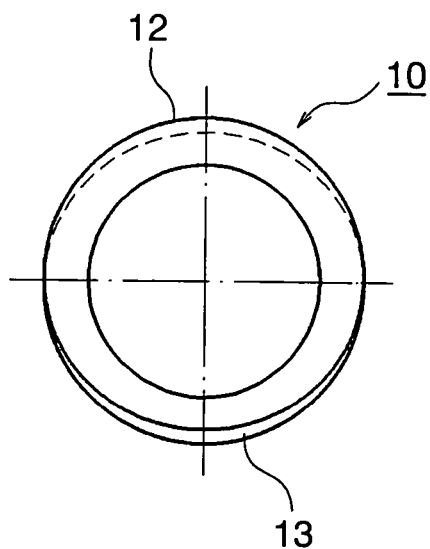
FIG. 3 is a plan view of the rotors to be combined with the stator of FIG. 1.
Figure 4:
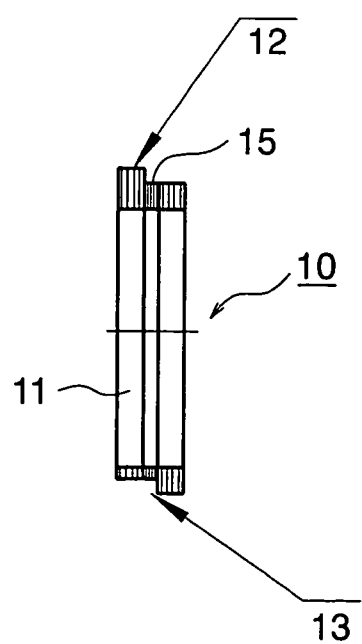
FIG. 4 is a sectional view of FIG. 3.

On the inner side of the annular stator 1, a rotor 10 as shown in FIGS. 3 and 4 is provided so as to be rotatable around a shaft (not shown).

The rotor 10 includes perfectly circular first and second rotors 12 and 13 each mounted to a shaft (not shown) so as to be eccentric with respect to each other, with an annular rotor core 15 being provided between the first and second rotors 12 and 13 as needed; in some cases, however, no such rotor core is used. Apart from the perfectly circular configuration, these rotors may be of an out-of-round configuration or an eccentric circular configuration, exhibiting a well-known rotor outer diametrical configuration undergoing changes at $\sin n\theta$ or $\cos n\theta$ in gap permeance between the rotors 12, 13 and the stators 2, 3.

Figure 5:
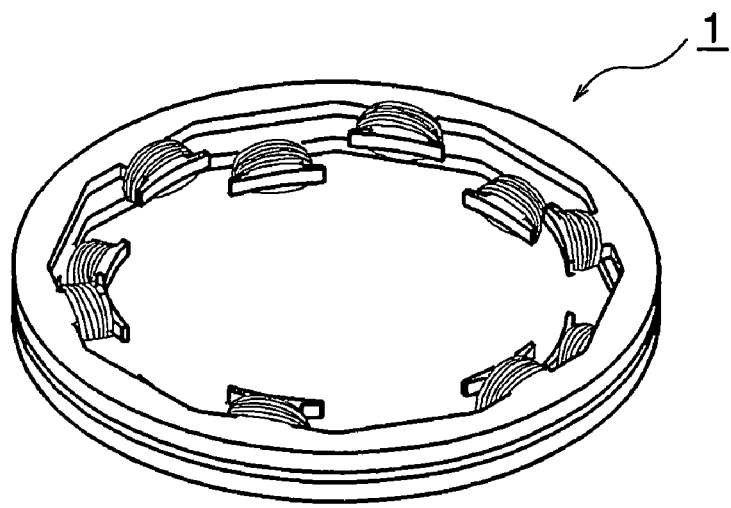
FIG. 5 is a perspective view of the annular stator of FIG. 1.

As shown in FIG. 5, in perspective view, the annular stator 1 described above has the first and second projected poles 4 through 4e and 5 through 5e arranged at positions differing in the axial direction, that is, in the thickness direction.

Figure 6:
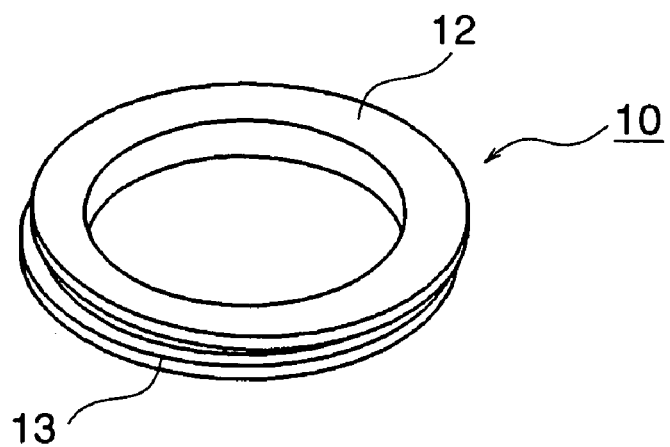
FIG. 6 is a perspective view of the rotor of FIG. 3.

Further, as shown in FIG. 6, in perspective view, in the rotor 10 described above, the first rotor 12 and the second rotor 13 are arranged so as to be deviated from each other by 180 degrees, the first rotor 12 corresponding to the first annular stator 2 and the second rotor 13 corresponding to the second annular stator 3 to respectively form a pair of first and second resolvers 20 and 21. Further, while in the above-described example the rotors 12 and 13 are arranged on the inner side of the stators 2 and 3, it is also possible for the stators 2 and 3 to be on the inner side and for the rotors 12 and 13 to be on the outer side.

Figure 7:
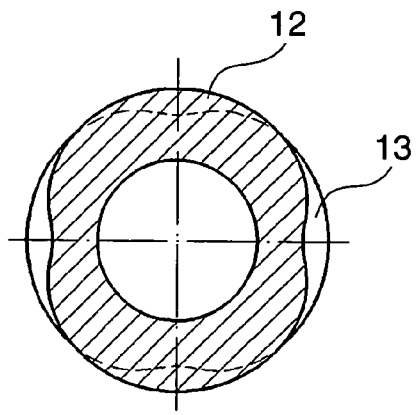
FIG. 7 is a construction diagram showing a modification of FIG. 3.
Figure 8:
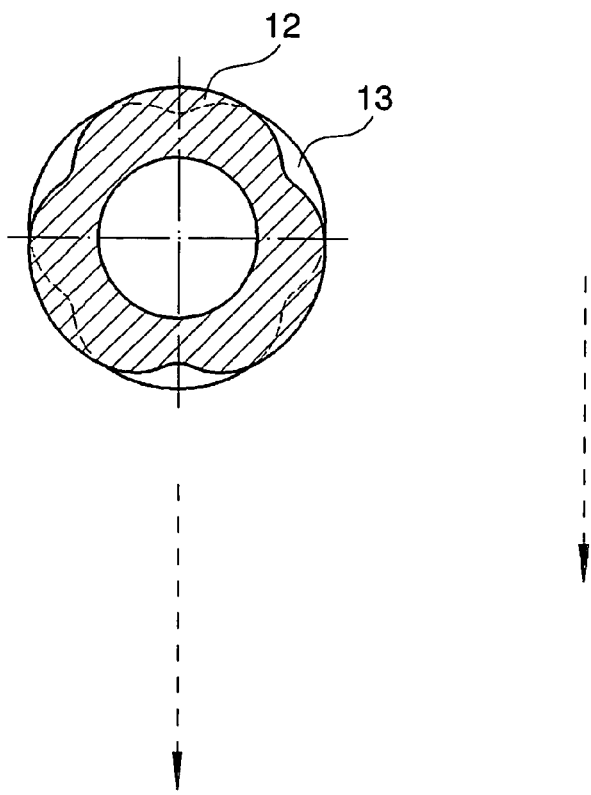
FIG. 8 is a construction diagram showing another modification of FIG. 3.

While the above rotor 10 is a 1X type with an axial double angle of 1, in the case of a 2X type with an axial double angle of 2 as shown in FIG. 7, elliptical first and second rotors 12 and 13 in which the n in $\sin n\theta$ and $\cos n\theta$ is 2 are arranged so as to be perpendicular to each other; as shown in FIG. 8, in the case of a 3X type with an axial double angle of 3, substantially triangular first and second rotors 12 and 13 with three protrusions in which the n in $\sin n\theta$ and $\cos n\theta$ is 3 are arranged so as to be deviated from each other by 60 degrees.

Figure 9:
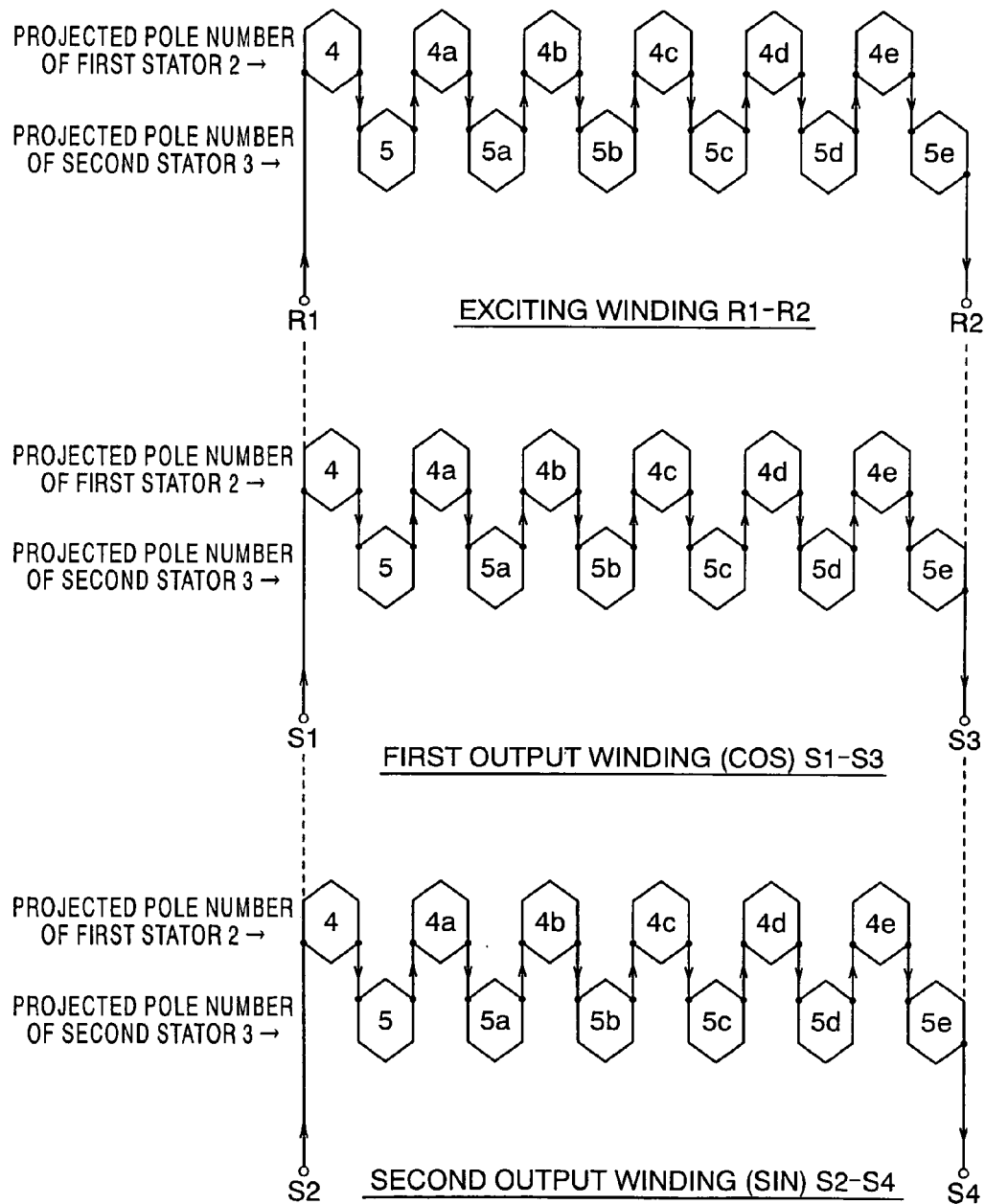
FIG. 9 is a winding diagram of the annular stator of FIG. 1.

FIG. 9 shows the winding structures of the exciting winding R1–R2 and the first and second output winding S1–S3 and S2–S4, which are 2-phase output windings, wound around the projected poles 4 through 4e and 5 through 5e (arranged in two stages in the axial direction) in the annular stator 1 shown in FIG. 1.

That is, the exciting winding R1–R2 is continuously wound by passing the first and second projected poles 4 through 4e and 5 through 5e alternately and continuously, and the winding is effected from the initial end to the terminal end by using a single winding apparatus, so that there is no need to perform serial connection of the windings as in the prior art.

The first output winding S1–S3 and the second output winding S2–S4 are also wound in the manner as described above. The exciting winding R1–R2 and the output winding S1–S4 are not restricted to 1-phase excitation and 2-phase output; they may also be of 1-phase excitation and 2-phase output and of n-phase excitation and m-phase output.

Figure 10:
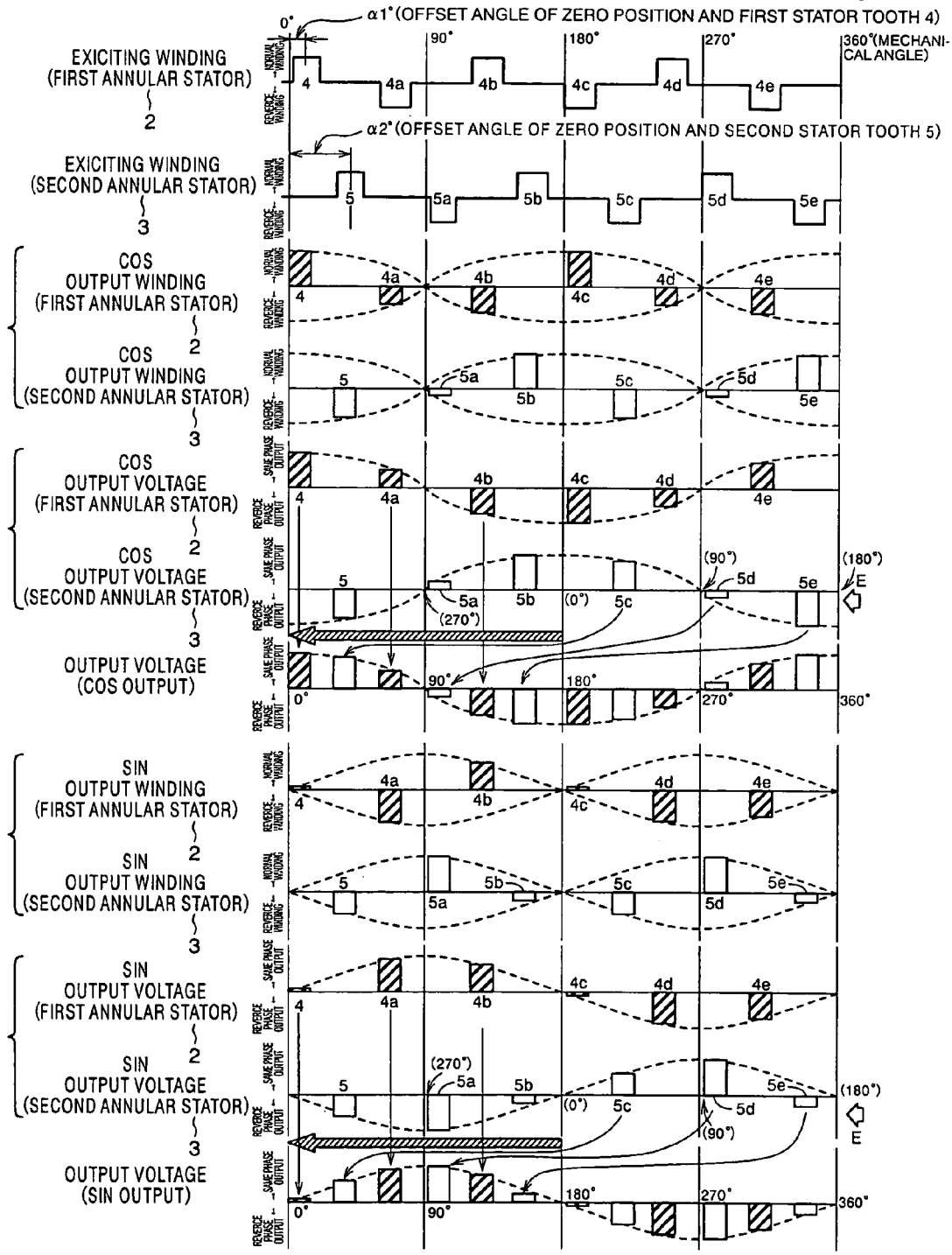
FIG. 10 is an explanatory diagram showing the winding direction, the winding number, and the output voltage of the winding of the 1X-VR resolver of the present invention.

FIG. 10 shows the winding directions and the output voltage distribution of the windings R1–R2, S1–S3, and S2–S4 in the first and second annular stators 2 and 3 in the case of 1X, the windings forming a well-known winding structure (see, e.g., U.S. Pat. No. 5,757,182) in which the winding number varies for each slot so that a sinusoidal 2-phase (sin, cos) output voltage may be output.

However, due to the relative deviation of the rotors by 180 degrees, the phase of the voltage output in the combination of the stator 2 and the rotor 12 and the phase of the voltage output in the combination of the stator 3 and the rotor 13 are such that the output windings S1–S4 of the stators 2 and 3 exhibit a winding distribution deviated in phase by 180 degrees.

Thus, as is well-known from Japanese Patent 3138606, the positions of origin of the stators and rotors of the pair of resolvers 20 and 21 are arranged so as to be deviated from each other by 180 degrees, synthesizing the output voltages of the resolvers 20 and 21, so that, despite the core deviation, the unbalance in voltage is canceled in the final output voltage, and the electrical error is reduced, thus making it possible to achieve stability. In FIG. 10, the second rotor 13 is deviated from the first rotor 12 in angle by 180 degrees, so that the output voltage distribution of the second annular stator 3 is deviated in phase by 180 degrees from that of the first annular stator 2 as indicated by the arrow E.

Figure 11:
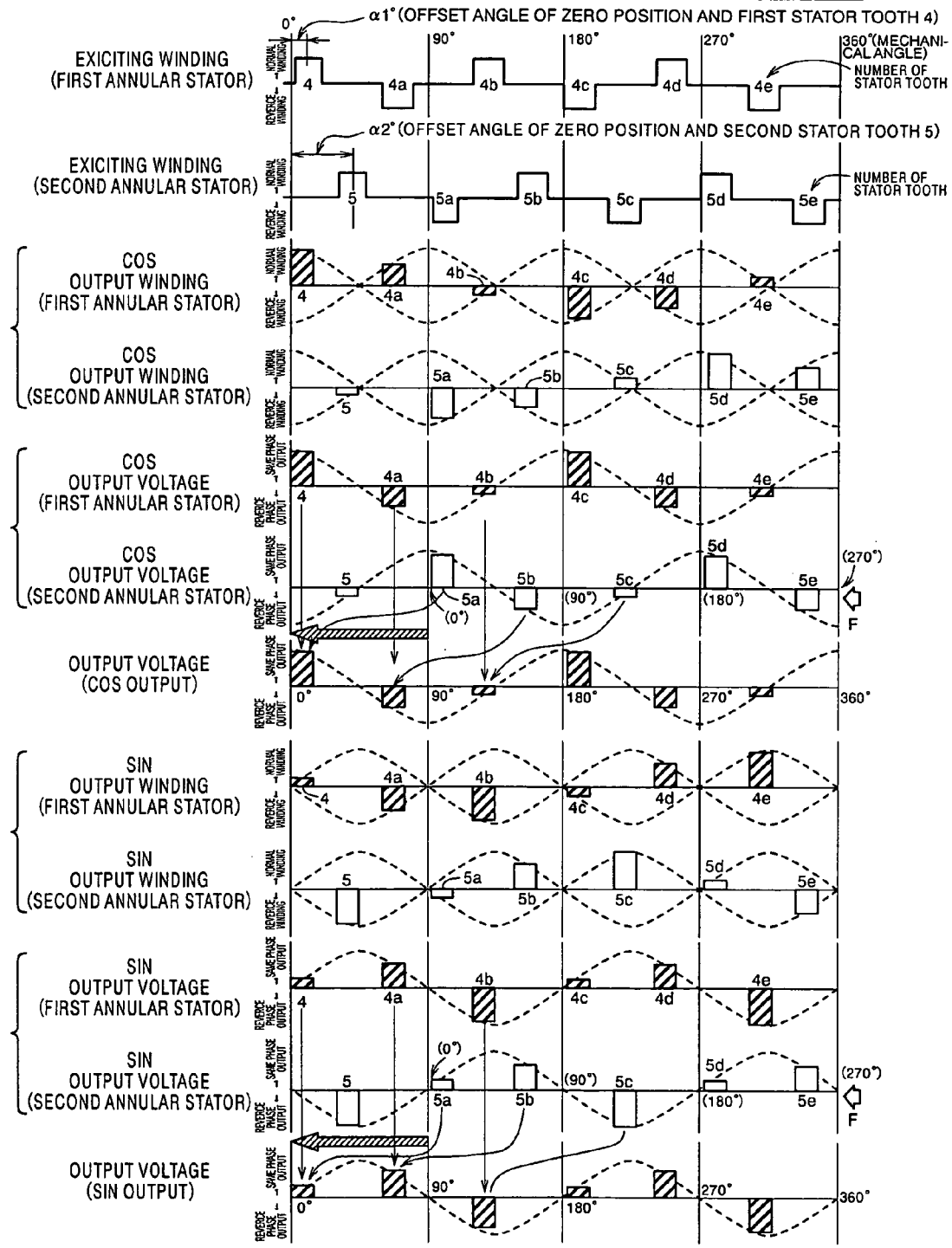
FIG. 11 is an explanatory diagram showing the winding direction, the winding number, and the output voltage of the winding of the 2X-VR resolver of the present invention.

FIG. 11 shows the winding direction and output voltage of a VR type resolver of 2X, which means the diagram only shows the difference between a 1X type and a 2X type resolver.

The annular stator 1 and the rotor 10 are formed of laminated plates, sintered bodies, molded products, or machined magnetic bodies. Further, similarly, a winding of 3X or more is also possible.

The number of projected poles (4 through 4e, 5 through 5e) of the stators 2 and 3 is not restricted to an even number; it may also be an odd number; further, in some cases, they are not opposed to each other by 180 degrees. Further, also in a construction of 2X or more, it is possible to achieve the same effect as the above construction of 1X.

Further, in FIG. 11, the second rotor 13 is deviated from the first rotor 12 by 90 degrees, so that the output voltage distribution of the second annular stator 3 is deviated in phase by 90 degrees from that of the first annular stator 2 as indicated by the arrow F.

The present invention is not restricted to a resolver; it is also applicable to a synchro (1-phase-excitation/3-phase-output), or a resolver of n-phase-excitation/m-phase-output, where n and

What is claimed is:

1. A rotation angle detector comprising: an annular stator (1) comprising a first annular stator (2) having a plurality of first projected poles (4 through 4e) projected inwardly at predetermined angular intervals and a second annular stator (3) stacked together with the first annular stator (2) and having a plurality of second projected poles (5 through 5e) projected inwardly at predetermined angular intervals so as not to overlap the first projected poles (4 through 4e); a rotor (10) having first and second rotors (12, 13) rotatably provided inside the annular stator (1), corresponding to the first and second annular stators (2, 3), differing from each other in phase, and being constructed solely of cores; and an exciting winding (R1–R2) and output windings (S1–S3, S2–S4) wound by using the first and second projected poles (4 through 4e, 5 through 5e), wherein the exciting winding (R1–R2) and the output windings (S1–S3, S2–S4) are wound continuously from the initial to the terminal ends thereof by way of the first and second projected poles (4 through 4e, 5 through 5e).

2. A rotation angle detector according to claim 1, wherein an annular stator core (8) is provided as a layer between the first and second annular stators (2, 3).

3. A rotation angle detector according to claim 2, wherein the first projected poles (4 through 4e) and the second projected poles (5 through 5e) are arranged so as to be opposed to each other by 180 degrees.

4. A rotation angle detector according to claim 2, wherein the first and second annular stators (2, 3) and the first and second rotors (12, 13) are constructed by one of laminated plates, sintered bodies, molded products, and machined magnetic bodies.

5. A rotation angle detector according to claim 2, wherein the first and second rotors (12, 13) each comprise one of an out-of-round configuration and an eccentric circular configuration for one of 1X and nX, and have a rotor outer diametrical configuration such that the gap permeance of the rotors (12, 13) and the stators (2, 3) varies at one of $\sin n\theta$ and $\cos n\theta$.

6. A rotation angle detector according to claim 2, wherein an annular rotor core (15) is provided as a layer between the first and second rotors (12, 13).

7. A rotation angle detector according to claim 1, wherein the first projected poles (4 through 4e) and the second projected poles (5 through 5e) are arranged so as to be opposed to each other by 180 degrees.

8. A rotation angle detector according to claim 7, wherein the first and second annular stators (2, 3) and the first and second rotors (12, 13) are constructed by one of laminated plates, sintered bodies, molded products, and machined magnetic bodies.

9. A rotation angle detector according to claim 7, wherein the first and second rotors (12, 13) each comprise one of an out-of-round configuration and an eccentric circular configuration for one of 1X and nX, and have a rotor outer diametrical configuration such that the gap permeance of the rotors (12, 13) and the stators (2, 3) varies at one of $\sin n\theta$ and $\cos n\theta$.

10. A rotation angle detector according to claim 7, wherein an annular rotor core (15) is provided as a layer between the first and second rotors (12, 13).

11. A rotation angle detector according to claim 1, wherein the first and second annular stators (2, 3) and the first and second rotors (12, 13) are constructed by one of laminated plates, sintered bodies, molded products, and machined magnetic bodies.

12. A rotation angle detector according to claim 11, wherein the first and second rotors (12, 13) each comprise one of an out-of-round configuration and an eccentric circular configuration for one of 1X and nX, and have a rotor outer diametrical configuration such that the gap permeance of the rotors (12, 13) and the stators (2, 3) varies at one of $\sin n\theta$ and $\cos n\theta$.

13. A rotation angle detector according to claim 11, wherein an annular rotor core (15) is provided as a layer between the first and second rotors (12, 13).

14. A rotation angle detector according to claim 1, wherein the first and second rotors (12, 13) each comprise one of an out-of-round configuration and an eccentric circular configuration for one of 1X and nX, and have a rotor outer diametrical configuration such that the gap permeance of the rotors (12, 13) and the stators (2, 3) varies at one of $\sin n\theta$ and $\cos n\theta$.

15. A rotation angle detector according to claim 14, wherein an annular rotor core (15) is provided as a layer between the first and second rotors (12, 13).

16. A rotation angle detector according to claim 1, wherein an annular rotor core (15) is provided as a layer between the first and second rotors (12, 13).

17. A rotation angle detector according to claim 1, wherein the number of slots (2A, 3A) formed in each of the first and second annular stators (2, 3) is at least four.

18. A rotation angle detector according to claim 1, wherein the exciting winding (R1–R2) and the output windings (S1–S3, S2–S4) each comprise one of 2-phase/1-phase, 1-phase/2-phase, and n-phase/m-phase.

19. A rotation angle detector according to claim 1, wherein the stators (2, 3) and the rotors (12, 13) each comprise one of an outer type and an inner type.

20. A rotation angle detector according to claim 1, wherein the exciting winding (R1–R2) and the output windings (S1–S3, S2–S4) of the stators (2, 3) are alternately wound around the projected poles (4 through 4*e*, 5 through 5*e*) of the stators (2, 3).

\* \* \* \* \*